United States Patent
Wolter et al.

(10) Patent No.: US 11,249,099 B2
(45) Date of Patent: Feb. 15, 2022

(54) OPTIMIZING LIQUID CLASSES FOR A LABORATORY AUTOMATION DEVICE

(71) Applicant: TECAN TRADING AG, Maennedorf (CH)

(72) Inventors: Anja Wolter, Darmstadt (DE); Michael Keller, Bauma (CH)

(73) Assignee: TECAN TRADING AG

( * ) Notice: Subject to any disclaimer, the term of this patent is extended or adjusted under 35 U.S.C. 154(b) by 314 days.

(21) Appl. No.: 16/359,265

(22) Filed: Mar. 20, 2019

(65) Prior Publication Data

US 2019/0293672 A1    Sep. 26, 2019

(30) Foreign Application Priority Data

Mar. 22, 2018  (EP) .................................... 18163422

(51) Int. Cl.
*G01N 35/10*  (2006.01)
*G01N 35/00*  (2006.01)

(52) U.S. Cl.
CPC ... *G01N 35/1016* (2013.01); *G01N 35/00584* (2013.01)

(58) Field of Classification Search
CPC ......... G01N 35/1016; G01N 35/00584; G01N 35/00871; G01N 29/4418; B01L 3/0293; B01L 3/0237
See application file for complete search history.

(56) References Cited

U.S. PATENT DOCUMENTS

| 10,132,735 | B2 | 11/2018 | Muraki |
| 10,386,865 | B2 | 8/2019 | Cartwright et al. |
| 2002/0076818 | A1 | 6/2002 | Vessey et al. |

(Continued)

FOREIGN PATENT DOCUMENTS

| CN | 1925918 A | 3/2007 |
| CN | 103282781 A | 9/2013 |

(Continued)

OTHER PUBLICATIONS

Kwong et al., A genetic algorithm based knowledge discovery system for the design of fluid dispensing processes for electronic packaging, 2009, Expert Systems with Applications, vol. 36, pp. 3829-3838 (Year: 2009).*

(Continued)

*Primary Examiner* — Jill A Warden
*Assistant Examiner* — John McGuirk
(74) *Attorney, Agent, or Firm* — MH2 Technology Law Group LLP (57) ABSTRACT

A liquid class including control parameters for controlling a laboratory automation device when handling a liquid of a liquid type assigned to the liquid class with a pipette tip of a pipette tip type assigned to the liquid class, and a method for optimizing the liquid class. The method can include initializing a genetic algorithm with a start liquid class by generating a set of liquid classes by modifying control parameters of the start liquid class. The method can further include optimizing the liquid class iteratively with the genetic algorithm by applying liquid classes from the set of liquid classes to the laboratory automation device, which performs at least one aspiration and dispensing measurement for each applied liquid class, as well as additional method acts.

17 Claims, 5 Drawing Sheets

(56) References Cited

U.S. PATENT DOCUMENTS

| | | |
|---|---|---|
| 2007/0025882 A1 | 2/2007 | Zuppiger et al. |
| 2008/0210023 A1 | 9/2008 | Telimaa et al. |
| 2009/0288470 A1* | 11/2009 | Bentz .................. B01L 3/021 |
| | | 73/1.74 |
| 2013/0280143 A1 | 10/2013 | Zucchelli et al. |
| 2017/0067926 A1 | 3/2017 | Meyberg |
| 2017/0299123 A1 | 10/2017 | Fowler et al. |

FOREIGN PATENT DOCUMENTS

| | | | |
|---|---|---|---|
| CN | 103718020 A | 4/2014 | |
| CN | 104046774 A | 9/2014 | |
| CN | 104870974 A | 8/2015 | |
| CN | 105159336 A | 12/2015 | |
| CN | 106492894 A | 3/2017 | |
| WO | 2014-102160 A1 | 7/2014 | |
| WO | WO-2017214679 A1 * | 12/2017 | ....... G01N 35/00584 |

OTHER PUBLICATIONS

Kotragouda, Application of Genetic Algorithms and CFD for Flow Control Optimization, 2007, University of Kentucky Master's Theses, pp. 61-62 (Year: 2007).*

Notification of First Office Action and Search Report dated Oct. 26, 2021 in corresponding Chinese Application No. 20190221362.6 (English translation provided), 28 pages.

* cited by examiner

OPTIMIZING LIQUID CLASSES FOR A LABORATORY AUTOMATION DEVICE

CROSS REFERENCE

This application claims priority to European Patent Application No. 18163422.1, filed Mar. 22, 2018, the disclosure of which is herein incorporated by reference in its entirety.

FIELD

The invention relates to a method, a computer program, a computer-readable medium and an optimization system for optimizing a liquid class for a laboratory automation device.

BACKGROUND

Laboratory automation devices are used for automating tasks of a laboratory assistant, which, for example, tests a patient for specific diseases. Usually, a sample of the patient's blood, urine, stool, etc. is taken and analyzed by means of a bio-chemical procedure. Such a procedure consists in various operations like adding substances, incubating, separating, etc. and a measurement process which quantitatively or qualitatively measures the amount or presence of a substance indicating the specific disease.

For transporting liquids between different vessels, such as test tubes, microtiter plates, container with reagents, etc., every laboratory automation device has an aspiration and dispensing system, which can aspirate a liquid at a first place, transport the aspirated liquid to a second place and dispense it there. As a rule, the aspiration and dispensing system has an actuator, which is adapted for gripping a disposable pipette tip and for changing a pressure inside the pipette tip, for example via a tube and a pump attached to the pipette tip.

All-purpose laboratory automation devices should be adapted for processing liquids of different types, such as blood, water, etc., with different types of pipette tips, which may have different volumes and/or different geometric forms. Due to the different physical properties of the liquids and the influence of the geometric form of the pipette tip on the dynamical process during aspiration and dispensing, the aspiration and dispensing system has to be controlled differently, when different liquids and/or different pipette tips are used and the same process parameters, such as a nominal aspirated volume and a nominal variance of the volume, are desired.

Therefore, so called liquid classes have been introduced, which comprise set of control parameters, which have been optimized with respect to specific process parameters. These control parameters, such as a speed profile for the pump and a movement speed profile for the pipette tip dipped into and pulled out from the liquid, are applied to the laboratory automation device, when the specific liquid type is processed with the pipette tip assigned to the liquid class.

The definition of a liquid class and its control parameters is a rather complex task, since many properties of the combined system of aspiration and dispensing system, pipette tip and liquid influence the aspiration and dispensing process. For example, the geometric shape of the lower end of the pipette tip in combination with the wetting properties of the liquid and the speed of pulling the pipette tip out of the liquid may influence the amount of liquid adhering at an outside of the tip and therefore the liquid volume transported with the tip. Furthermore, defining and optimizing a liquid class, for example to have a lower variance in aspirated and dispensed volume, is very time consuming, since a high number of samples have to be processed and measured until desired control parameters have been found. This also complicates the automation of the process, since at the beginning, it may be not quite clear, which combination of control parameters have which impact on which process parameters.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Objectives of the invention are to facilitate the optimization of liquid classes, to reduce the number of processed samples during optimization of a liquid class, and to automate the optimization of liquid classes.

These objectives are achieved by the subject-matter of the independent claims. Further exemplary embodiments are evident from the dependent claims and the following description.

A first aspect of the invention relates to a method for optimizing a liquid class for a laboratory automation device. The laboratory automation device may comprise an aspiration and dispensing system, which may be adapted for gripping pipette tips and/or for generating different pressures in the pipette tips. For example, a gripped pipette may be interconnected with a pump, for example via a hose. The aspiration and dispensing system furthermore may comprise a movement actuator, which is adapted for moving the gripped pipette tip to different positions. It also may be possible that a fixed pipette tip is used. In this case a gripper for pipette tips may not be necessary, The liquid class may be assigned to a liquid type and/or to a pipette tip type of the laboratory automation device. A liquid type may be defined via physical properties of the liquid, such as viscosity, surface tension, etc. However, in the liquid class, the liquid type may be identified with an identifier such as a number or a name. The pipette tip type may be defined via its geometric properties, such as the geometric form of its interior volume, the geometric form of the outer shape of the tip, etc. It also may be defined via physical properties, such as the wettability of its surface. However, in the liquid class, the pipette tip type may be identified with an identifier such as a number or a name.

The liquid class comprises control parameters for controlling the laboratory automation device handling a liquid type with a pipette tip type assigned to the liquid class. The control parameters may be used for controlling actuator components of the aspiration and dispensing system, for example the pump and the movement actuator. In particular, the control parameters may be used for controlling the speed and/or accelerating of the pump and/or the movement actuator.

In general, a control parameter may be or may comprise a numerical value, which encodes this speed and/or acceleration. It also may be that a control parameter comprises a plurality of numerical values, which, for example, may define a speed and/or acceleration profile.

According to an embodiment of the invention, the method comprises: initializing a genetic algorithm with a start liquid class by generating a set or population of liquid classes by modifying control parameters of the start liquid class. For example, the genetic algorithm may apply mutation and crossing-over to the liquid class for modifying the control parameters. Mutation and crossing-over may be performed as described below.

The start liquid class may be a liquid class, which has been optimized with other methods, for example manually by an expert or with other optimization methods, such as methods based on a simulation model or a physical model, for example as described below. It also may be that the start liquid class is generated from random numbers.

Another possibility is that intervals for each control parameter are set. The intervals then may be used to generate a list of data points. The start population may be initialized by selecting randomly data points of this list until the population size is reached. Data points may only be once added to the start population.

In the present context, a genetic algorithm is a method performed by a computer device, which optimizes a set of liquid classes by generating new liquid classes by modifying liquid classes from the set and by discarding liquid classes that are in a sense not as optimal as other ones in the set. The grade of optimization may be computed with a selection function, which is applied to process parameters generated by the liquid class. With the present method, the process may be measured by the laboratory automation device, when the laboratory automation device is controlled based on the control parameters of the liquid class.

According to an embodiment of the invention, the method furthermore comprises: optimizing the liquid classes in the set of liquid classes iteratively with the genetic algorithm by: applying liquid classes from the set of liquid classes to the laboratory automation device, discarding liquid classes from the set of liquid classes with a selection function and adding liquid classes to the set of liquid classes, which are generated by modifying liquid classes from the set of liquid classes. These steps may be repeated many times until a stop condition is reached. Such a stop condition may be a fixed number of repetitions or a threshold for the grade of optimization.

According to an embodiment of the invention, the method furthermore comprises: applying liquid classes from the set of liquid classes to the laboratory automation device, which performs at least one aspiration and dispensing measurement controlled with the control parameters of each applied liquid class, in which at least one dispensed volume of a liquid of the liquid type is measured. When a liquid class is applied to the laboratory automation device, the laboratory automation device may aspirate a volume of liquid from a container, and may dispense the volume into a measurement device, which measures the dispensed volume. This dispensed volume may be seen as a process parameter that is generated for the liquid class. It may be that an unused pipette tip is gripped before the aspiration and is discarded after the dispensing.

The measurement device may be a balance and the dispensed volume may be calculated by the measured weight of the dispensed liquid and its density.

The measurement device may be a photometer measuring the absorbance of a stained liquid at a suitable wave length. The liquid pipetted in a microtiter plate may be a stained solution and the concentration of the dye of the stained solution may be known. Using a calibration curve, the volume may be determined with the photometer by the measured absorbance.

It has to be noted that the laboratory automation device may be provided with the liquid of the liquid class, for example in a container, and a plurality of pipette tips of the pipette tip types before the optimization method starts. With this liquid and these pipette tips, the optimization method may be performed automatically.

According to an embodiment of the invention, the method comprises: discarding liquid classes from the set of liquid classes, when a selection function, which evaluates the at least one measured dispense volume for a liquid class, indicates this. The selection function may be a function that calculates an optimization grade from the one or more process parameters, such as the dispensed volume. The optimization grade may be a numerical value. For example, when the optimization grade of a first liquid class is higher than the one of a second liquid class, then it may be decided that the first liquid class is better optimized than the second liquid class. For example, a liquid class may be discarded from the set of liquid classes, when the difference of its optimization grade with a best optimization grade is higher than a threshold.

According to an embodiment of the invention, the method comprises: adding liquid classes to the set of liquid classes, which are generated by modifying liquid classes from the set of liquid classes. As already mentioned, these modifications may be based on mutation and/or crossing-over. For example, the liquid class may be represented as a string of alphanumerical values. Mutation may be that an alphanumerical value is changed into another, for example into a similar alphanumerical value. Here, a similar value may be defined with a mapping function, which may be based on a lookup table or by incrementing or decrementing the alphanumerical value.

Crossing-over may be that two liquid classes are combined. For example, the strings of alphanumerical values of two liquid classes may be cut and one part of the string of one class may be connected with the other part of the string of the other class.

According to an embodiment of the invention, the method comprises: selecting an optimized liquid class from the set of liquid classes. When the stop condition has been reached, the best optimized liquid class may be selected. For example, this may be the liquid class from the set of liquid classes with the most optimal optimization grade, which optimization grade may be provided by or calculated with the selection function.

In general, the grade of optimization may depend on a difference of a process parameter from a nominal value and/or the variance of a process parameter.

According to an embodiment of the invention, the selection function selects liquid classes, where the at least one measured dispense volume differs not more than a threshold from a desired dispense volume. The grade of optimization may be or may be based on the difference between the measured dispense volume and a desired dispense volume.

According to an embodiment of the invention, the aspiration and dispensing measurement is performed several times for an applied liquid class, several dispensed volumes are measured for the applied liquid class and the selection function selects liquid classes, where a variance of the several measured dispense volumes is smaller than a threshold. For determining a variance of a process parameter, the process parameter may have to be determined several times and/or the liquid class has the applied several times to the laboratory automation device. The grade of optimization may be or may be based on the variance of the measured dispense volume.

It also may be that the selection functions is based on more than one process parameter, such as the dispensed volume and the variance thereof. For example, both values may be aggregated with a weight function.

The use of a genetic algorithm for optimizing the liquid class may have the advantage that no knowledge of the mutual influence of the control parameters on the process parameters is necessary. The optimization process may be performed completely automatically. Furthermore, tests have confirmed that crossing-over applied during the generation of modified liquid classes may result in a faster convergence towards optimized liquid classes.

According to an embodiment of the invention, modified control parameters for a modified liquid class are generated by modifying one control parameter of another liquid class. Mutation may be performed by modifying one control parameter. For example, a control parameter may be randomly selected. The modified control parameter or a numerical value encoded in the control parameter may be increased or decreased with a value smaller than a threshold. It also may be that bounds are defined for some or all control parameters and that the modified control parameter has to stay within these bounds.

According to an embodiment of the invention, modified control parameters for a modified liquid class are generated by combining control parameters of two other liquid classes. Crossing-over may be performed by selecting a subset of control parameters from a first liquid class and replacing these control parameters in a second liquid class. The subset of control parameters and/or the number of control parameters may be chosen randomly.

According to an embodiment of the invention, the control parameters comprise at least one of: an aspiration speed, an aspiration acceleration and/or an aspiration delay; a dispensing speed, a dispensing acceleration and/or dispensing delay; a dipping speed and/or dipping acceleration of the pipette tip; a pulling speed and/or pulling acceleration of the pipette tip. The aspiration and dispensing speed and/or acceleration may refer to a speed or acceleration of the pump. The dipping and pulling speed and/or acceleration may refer to a speed and/or acceleration of the pipette tip, when dipped into the liquid or pulled out of the liquid.

The aspiration and dispensing speed may be defined via components of the pump, which may be a syringe with a syringe plunger moving in a volume of the syringe or a plunger moving in a hollow cylinder.

The aspiration speed may be a speed how fast the plunger moves in the syringe or hollow cylinder in μl/sec expanding the volume in the syringe or hollow cylinder. The aspiration speed may be calculated by the syringe size, the number of steps of a full stroke and the number of steps moved per sec. The same applies to a plunger in a hollow cylinder system. It has to be noted that the aspiration speed need not be equal to the speed the liquid is sucked in the orifice of the pipetting tip.

The dispensing speed may be a speed how fast the syringe plunger moves in the syringe (displacing volume in the syringe) in μl/sec. It may be calculated by the syringe size, the number of steps of a full stroke and the number of steps moved per sec. It has to be noted that the dispensing speed need not be equal to the speed the liquid is expelled out the orifice of the pipetting tip. The same applies to a plunger in a hollow cylinder system.

The aspiration and/or dispensing speeds may be top speeds respectively maximum speeds. For small volumes, a top speed may never reached. The ramping up to aspiration speed may be not too steep e.g. for viscous samples and/or may be limited by a maximum aspiration acceleration. The ramping down from the dispensing speed may be as steep as possible for a good drop break-off from the pipetting tip and/or may be defined with a specific dispensing acceleration.

The aspiration delay may be defined by a time between the plunger stops and the tip is retracted from the liquid. An aspiration delay may prevent air from being aspirated into the pipette tip. When the plunger has stopped, under-pressure may still be in the system and aspirating liquid. A longer delay may be required for viscous samples.

The dispense delay may be defined by a time between the plunger stops and the tip is retracted from the cavity, where the liquid has to be dispensed. When the plunger has stopped, pressure may still be in the system and liquid may still be dispensed.

According to an embodiment of the invention, the control parameters comprise at least one of: an additional aspiration volume; a dipping depth. The additional aspirating volume may be a volume that is additionally aspirated into the pipette tip but after that not dispensed.

According to an embodiment of the invention, the control parameters comprise an airgap size, for example between liquids in the aspiration and dispensing system. An airgap may separate a sample liquid from a system liquid preventing dilution of the sample and/or may prevent droplets at the end of the pipette tip while the pipette tip moves. The airgap size may be provided in μl. An aspiration and/or dispensing speed of an airgap may be a further control parameter.

The airgap may be a system trailing airgap, i.e. a part of an airgap between the system liquid and the sample liquid, which is not dispensed when the sample liquid is dispensed. The airgap may be a leading airgap, i.e. a part of an airgap between the system liquid and the sample liquid, which is dispensed together with the sample liquid. The leading airgap may be used for blowing out of a small sample volume.

The airgap may be a sample trailing airgap, i.e. an airgap aspirated after aspiration of the sample liquid. The sample trailing airgap may prevent dropping of volatile sample liquids while the pipette tip moves over a worktable. The sample trailing airgap may be used for reaching a dispense speed for small volumes.

According to an embodiment of the invention, the control parameters comprise a subvolume size of an aspirated and/or dispensed volume. This size may be provided in μl.

For example, a subvolume may be a conditioning volume. A conditioning volume may help to dispense a first portion of a multipipetting distribution under similar conditions as the subsequent portions. After the dispensing of the conditioning volume, the mechanical hysteresis of the plunger may be eliminated.

A subvolume also may be an excess volume. An excess volume may help to complete the volume of the last portion of a multipipetting distribution. An excess volume may prevent the pipetted sample or reagent from a dilution by a system liquid. Up to 20%-30% of excess volume may be necessary to prevent a dilution by a system liquid.

Multipipetting distribution means that a volume is aspirated and/or is dispensed in more than one portions of the same volume or of different volumes.

In general, a control parameter may be a speed or acceleration of an actuator component. The control parameter also may be provided as speed profile and/or acceleration profile. During mutation, a speed profile may be modified by changing a point of the profile. During crossing-over, a speed profile may be generated by combining two speed profiles. For example, a time point may be chosen and the speed profile before the time point may be taken from a first liquid class and the speed profile after the time point may be taken from a second liquid class.

As already mentioned, the start liquid class, with which the genetic algorithm is initialized, may be provided with another method that can optimize a liquid class. For example, such a method may be solely based on computations, such as a simulation of the aspiration and dispensing system and/or solving physical equations modelling the aspiration and dispensing system.

The pre-optimization with a solely computational based method, i.e. without performing measurements, may have the advantage that the genetic algorithm, which in the beginning may have a poor convergence towards the optimized liquid, is only used for optimizing already good liquid classes.

It also may be that the liquid class determined based on the genetic algorithm is further optimized with a solely computational based method.

According to an embodiment of the invention, the liquid class is additionally optimized with a simulation model, wherein the simulation model comprises a geometric representation of at least a part of a dispensing and aspiration system of the laboratory automation device, which part comprises a pipette tip of the pipette tip type. For example, the form of the opening of the pipette tip and/or its internal volume may be modelled. A geometric representation may comprise geometric forms, such as curved surfaces, cylinders, etc. Also the liquid may be simulated with the simulation model.

The control parameters of the liquid class may be transformed into movements of the pipette tip in the simulation model and/or into pressures applied to an internal volume of the pipette tip. With this, the aspiration process and optionally the dispensing process may be simulated. In the end, the aspirated volume or the dispensed volume may be taken as process parameter.

Variances of a process parameter may be determined with a Monte-Carlo simulation, i.e. by randomly varying parameters. For example, this may be done by modifying points of the geometric representation and/or physical parameters, for example of the liquid and/or the pipette.

According to an embodiment of the invention, the liquid class is iteratively optimized with the simulation model by: simulating the part of the dispensing and aspiration system with the control parameters of the liquid class, wherein a liquid in the pipette tip is simulated based on physical properties of the liquid; determining a dispensed volume from the simulation model; and modifying the control parameters based on the dispensed volume.

Physical properties of the liquid may be viscosity, density, surface tension, etc.

Basically, also the optimization with the simulation model may be performed as described with respect to the genetic algorithm. For liquid classes, a process parameter is determined and based on a selection function, liquid classes with a higher grade of optimization may be determined. For example, also a genetic algorithm may be used for optimization. However, also other methods may be used, such as steepest descent.

According to an embodiment of the invention, the simulation model is based on finite elements and/or computational fluid dynamics. Both the pipette tip and the liquid may be modelled with a finite elements method.

The part of the dispensing and aspiration system represented by the simulation furthermore may comprise a pump and a hose connecting the pump to the pipette tip. It also may be that additionally the pump and/or a hose interconnecting the pump with the pipette tip, which may be flexible and may deform due to pressure changes, is simulated within the simulation model.

The geometric representation may comprise physical properties of components of the dispensing and aspiration system. Such physical properties may comprise elasticity, wettability, etc.

According to an embodiment of the invention, the liquid class is additionally optimized with a physical model, wherein the physical model comprises analytical equations modelling mechanical properties of at least a part of the dispensing and aspiration system. Contrary to the simulation model, the physical model may not model a dynamic three-dimensional representation of the aspiration and dispensing system but may be based on equations, which encode a behavior of components of the aspiration and dispensing system. For example, a hose interconnecting the pump with the pipette tip may behave as a damping element on the pressure, which is generated by the pump. Furthermore, a gas volume in the pipette tip may change its volume according to physical laws of an ideal gas.

According to an embodiment of the invention, the analytical equations model the liquid in the dispensing and aspiration system as an oscillating system having at least one damped mass connected to a spring.

According to an embodiment of the invention, the liquid class is iteratively optimized with the physical model by: simulating the part of the dispensing and aspiration system with the control parameters of the liquid class, wherein a liquid in the pipette tip is simulated based on physical properties of the liquid; determining a dispensed volume from the physical model; and modifying the control parameters based on the dispensed volume.

Basically, also the optimization with the physical model may be performed as described with respect to the genetic algorithm. For liquid classes, a process parameter is determined and based on a selection function, liquid classes with a higher grade of optimization may be determined. For example, also a genetic algorithm may be used for optimization. However, also other methods may be used, such as steepest descent.

While the optimization described in the beginning with respect to the genetic algorithm performs measurements with a real laboratory automation device for determining the one or more process parameters, in the case of the simulation model and the physical model, the real laboratory automation device is replaced with a method, in which the process parameters may be determined solely by computations.

As already mentioned, start control parameters or a start liquid class for initializing the genetic algorithm may be provided by the simulation model and/or the physical model. It also may be that start control parameters or a start liquid class for initializing the simulation model and/or the physical model may be provided by the genetic algorithm.

A further aspect of the invention relates to a computer program for optimizing a liquid class for a laboratory automation device, which, when being executed by a processor, is adapted to carry out the steps of the method as described in the above and in the following. The computer program may be executed in a computing device, such as a PC, communicatively interconnected with the laboratory automation device. The computer program may be seen as a control program for the laboratory automation device, which controls the laboratory automation device to perform the aspiration and dispensing of the liquid with the pipette tip as described in the above and in the below.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to an optimization system for optimizing a liquid class for a laboratory automation device, the optimization system comprising the laboratory automation device and a computing device communicatively interconnected with the laboratory automation device for performing the optimization and controlling the laboratory automation device as described above and below. The optimization system may be adapted for performing the method as described in the above and in the below.

According to an embodiment of the invention, the computing device comprises a genetic algorithm optimizer module, which performs the optimization of the liquid classes with the genetic algorithm. The genetic algorithm optimizer module may be adapted for initializing the genetic algorithm, for selecting optimized liquid classes and/or for performing mutation and/or crossing-over.

According to an embodiment of the invention, the computing device furthermore comprises a simulation model optimizer module, which may be adapted for optimizing liquid classes based on the simulation model as described in the above and in the below.

According to an embodiment of the invention, the computing device furthermore comprises a physical model optimizer module, which may be adapted for optimizing liquid classes based on the physical model as described in the above and in the below.

It has to be understood that features of the method as described in the above and in the following may be features of the optimization system, the computer program and the computer-readable medium as described in the above and in the following, and vice versa.

These and other aspects of the invention will be apparent from and elucidated with reference to the embodiments described hereinafter.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures. It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

Figure 1:
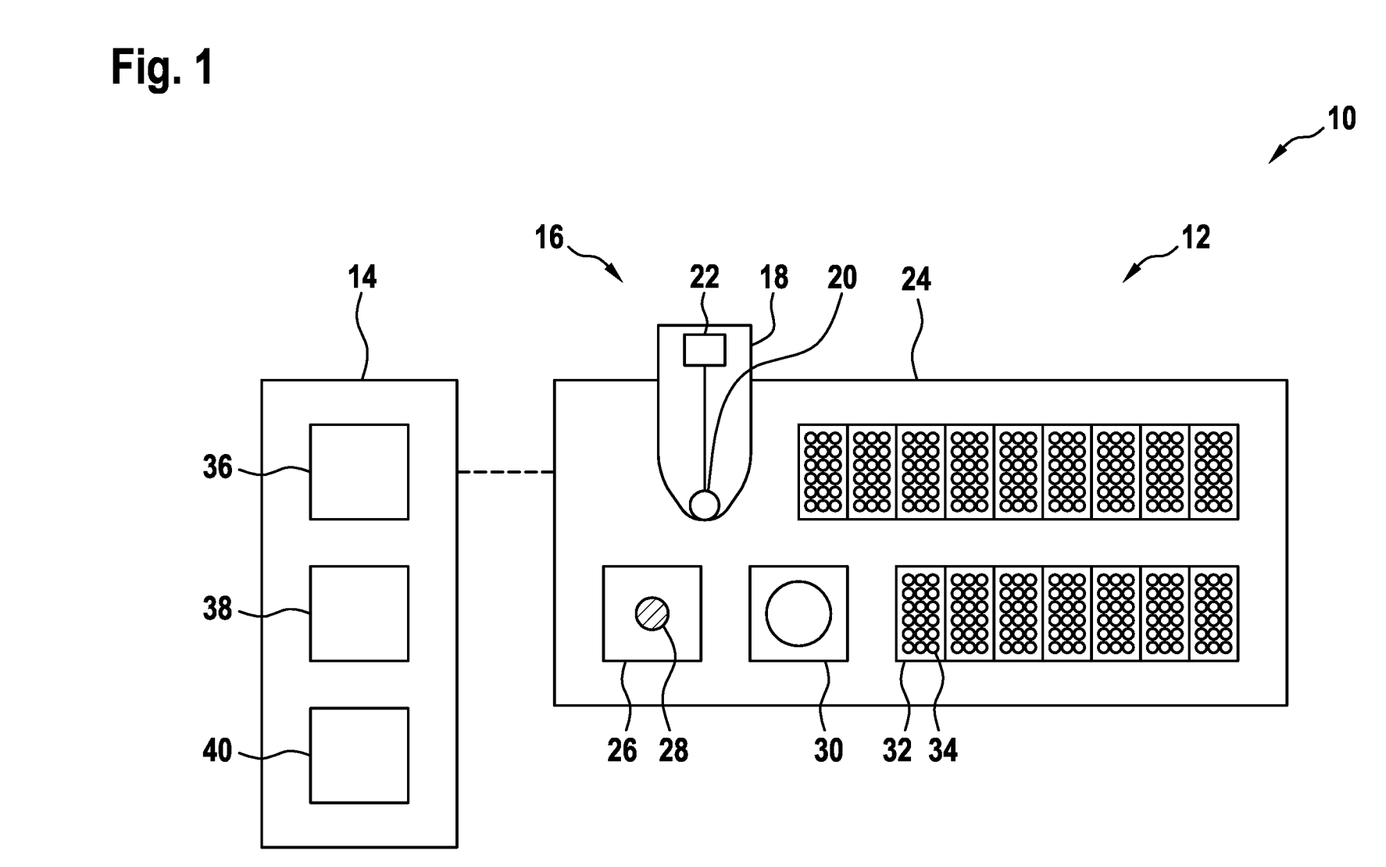
FIG. 1 schematically shows an optimization system with a laboratory automation device according to an embodiment of the invention.

FIG. 1 shows a system 10 comprising a laboratory automation device 12 and a computing device 14 for controlling the automation device 12.

The laboratory automation device 12 comprises an aspiration and dispensing system 16 with a movement actuator 18, a pipette gripper 20 and a pump 22. The laboratory automation device 12 furthermore comprises a workbench 24 to which exchangeable components can be attached. When a fixed pipette tip is used, the gripper 20 may be not necessary. In general, these components comprise containers with test tubes, microtiter plates, containers with reagents, etc., i.e. all kind of components that may be used in laboratory automation.

Since the laboratory automation device 12 is used for optimizing liquid classes, the following components are attached to the workbench 24: a container 26 with a liquid 28, a measurement device 30 adapted for measuring liquid volumes and optionally a plurality of containers with disposable pipette tips 34. With the optimization method, a plurality of pipette tips 34 may have to be used, when a pipette tip 34 is used only once.

With the movement actuator 18, the gripper 20 may be moved to a pipette tip 34, which then grips the pipette tip 34. The movement actuator 18 then may move the pipette tip 34 to the container 26 and may dip the pipette tip 34 into the liquid 28. With the pump 22, a volume of liquid 28 may then be aspirated. The movement actuator 18 then may move the pipette tip 34 to the measurement device 30 and may dispense the liquid volume in the pipette tip 34 there, which measures its volume. After that, the pipette tip 34 may be discarded. In case of using fixed tips, the step of gripping a pipette tip 34 may be omitted.

The computing device 14 is communicatively interconnected with the laboratory automation device 12, for example via Ethernet connection. The computing device 14 is adapted for generating control commands for the laboratory automation device 12 and for receiving measurement values from the measurement device 30.

The computing device 14 is adapted for performing a method for optimizing liquid classes as described in the above and in the below. To this end, the computing device comprises a genetic algorithm optimizer module 36 and optionally a simulation model optimizer module 38 and/or a physical model optimizer module 40. The functionality of the modules 36, 38, 40 will be described below in more detail.

Figure 2:
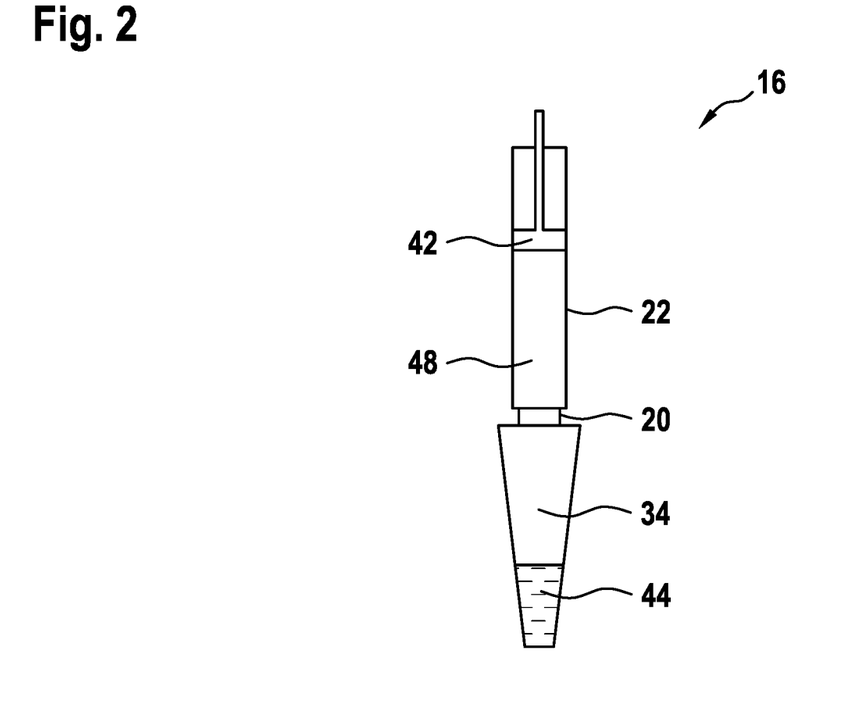
FIG. 2 schematically shows an embodiment of an aspiration and dispensing system of the laboratory automation device of FIG. 1.

FIG. 2 schematically shows an aspiration and dispensing system 16. The pump 22 may be designed like a syringe and/or may comprise a plunger 42 in a hollow cylinder for changing a pressure in the interior volume of the pipette tip 34. In FIG. 2 this is done with a gas volume 48 in the pump 22. FIG. 2 also shows an aspirated liquid volume 44, which was sucked into the interior volume of the pipette tip 34 and which may later be dispensed. The system 16 of FIG. 2 also may comprise a movement actuator 18 as described with respect to FIG. 1.

Figure 3:
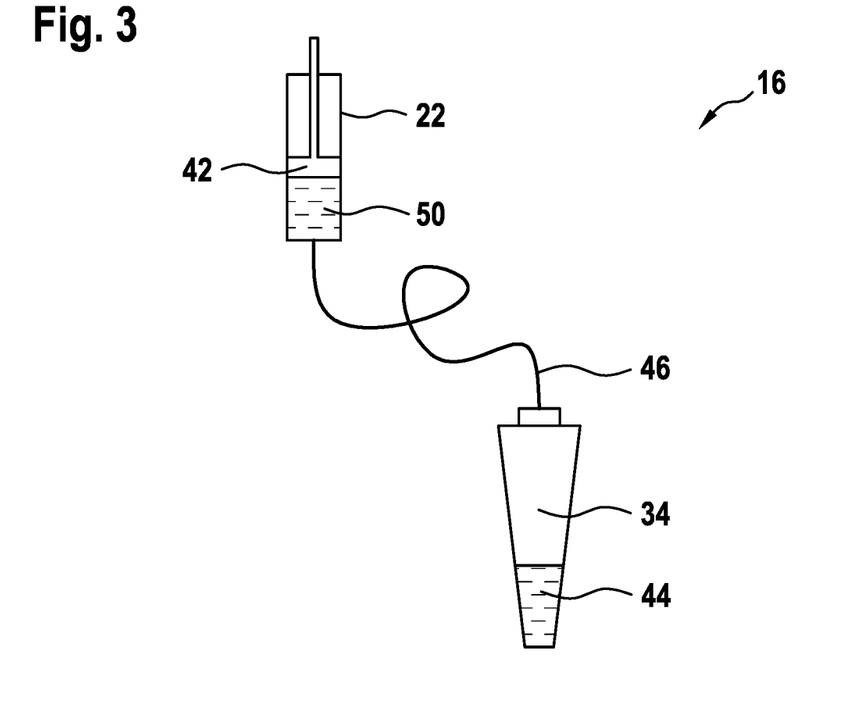
FIG. 3 schematically shows a further embodiment of an aspiration and dispensing system of the laboratory automation device of FIG. 1.

FIG. 3 shows a further aspiration and dispensing system 16, which may be designed like the one of FIG. 2, in which, however, the pump 22 is connected via a hose 46 to the pipette tip 34. The pump 22 and at least partially the hose 46 may be filled with a liquid 50, which may have a lower compressibility than the gas volume 48.

Figure 4:
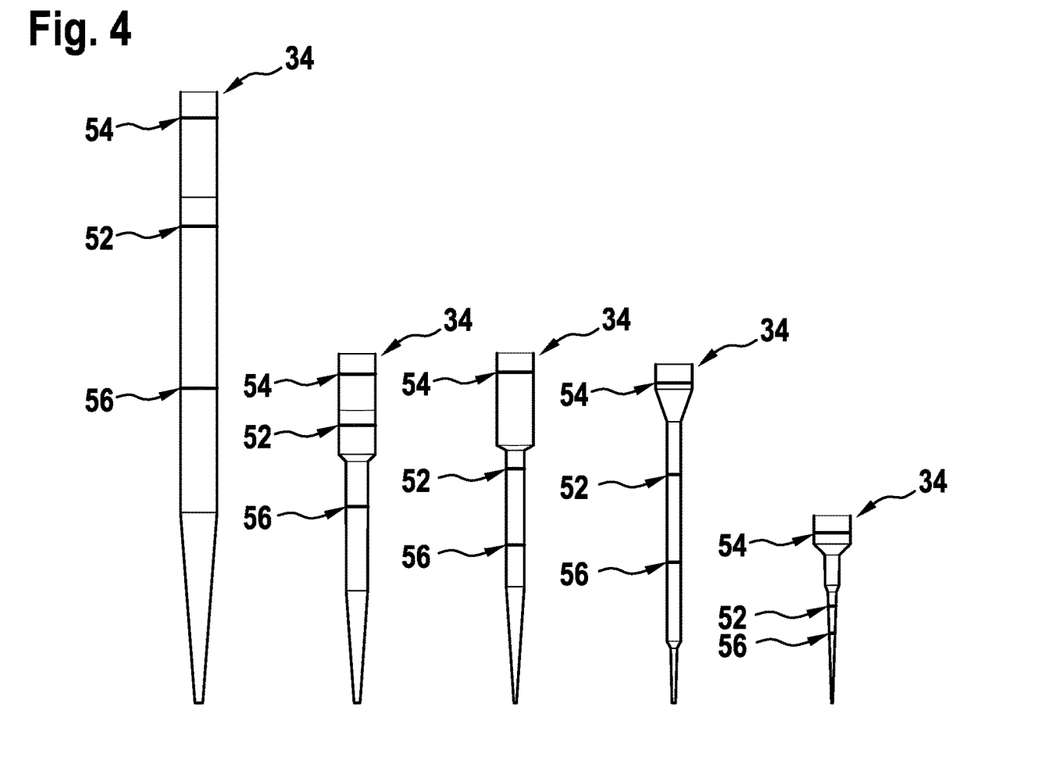
FIG. 4 schematically shows an embodiment of pipette tips for the laboratory automation device of FIG. 1.

FIG. 4 schematically shows pipette tips 34 of different types for the laboratory automation device of FIG. 1. The pipette tips 34 may have a nominal filling volume 52 of 1000 µl, 350 µl, 200 µl, 50 µl and 10 µl (from left to right). Furthermore, a dead volume 54 of 50 µl and a fill level 56 of 50% is indicated.

From FIG. 4 it can be seen that the pipette tips 34 are built up from one or more cones and one or more cylinders and/or have an increasing diameter from the end with the opening to the end to be gripped by the gripper 20.

The pipette tips 34 of FIG. 4 may be used with the same laboratory automation device 12 and due to their differences demand a different control of the same laboratory automation device 12. Furthermore, different liquid types, such as blood or ethanol, demand a different control of the movement actuator 18 and the pump 22, such that a desired accuracy for the dispensed volume 44 can be reached. In particular, the dispensed volume 44 always should be nearly equal to a desired volume, where only a maximal variance is allowed.

Figure 5:
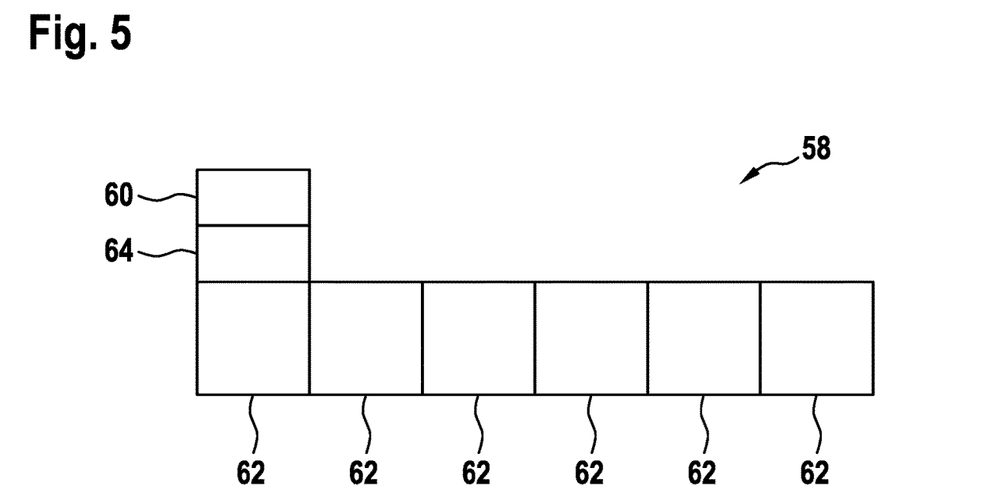
FIG. 5 schematically shows a liquid class for the laboratory automation device of FIG. 1.

For dealing with this issue, so called liquid classes 58 are defined, as shown in FIG. 5. A liquid class 58 may be a data structure, which is assigned to a liquid type 60 and a pipette tip type 64. The liquid type 60 may encode a special liquid and/or may define or encode physical properties of the liquid, such as viscosity, density, surface tensions, etc. The pipette tip type 64 may refer to a pipette tip 34 designed in a specific way, as shown in FIG. 4.

In general, a liquid class 58 furthermore comprises control parameters 62, which are used for controlling the laboratory automation device 12, when processing a liquid of the liquid type 60 with a pipette tip 34 of the pipette tip type 64.

In general, these control parameters 62 are used for controlling the laboratory automation device 12. The control parameters may comprise speeds and/or accelerations of components of the aspiration and dispensing system 16, such as the pump 22 and or the movement actuator 18. It also may be possible that profiles of such speeds and/or accelerations are control parameters 62. Furthermore, the control parameters may comprise values and/or quantities as defined above, for example such as airgaps, subvolumes of the liquid to be aspirated and/or dispensed, etc.

It also may be that control parameters 62 are present that control sensing of liquid levels and/or relative positions of components of the aspiration and dispensing system 16, such as an additional aspiration volume and/or a dipping depth.

The additional aspiration volume may control how much liquid is additionally sucked by the pipette tip 34 to the nominal filling volume 52 as shown in FIG. 4. During dispensing, only the nominal filling volume 52 may be pushed out of the pipette tip 34.

The dipping depth may control how deep the outermost tip of the pipette tip 34 is lowered into the liquid to be aspirated.

In general, a control parameter 62 may be a number or a set of numbers. These numbers may have an upper and/or a lower bound, which may be used during modification of the liquid class 58, as described below.

Figure 6:
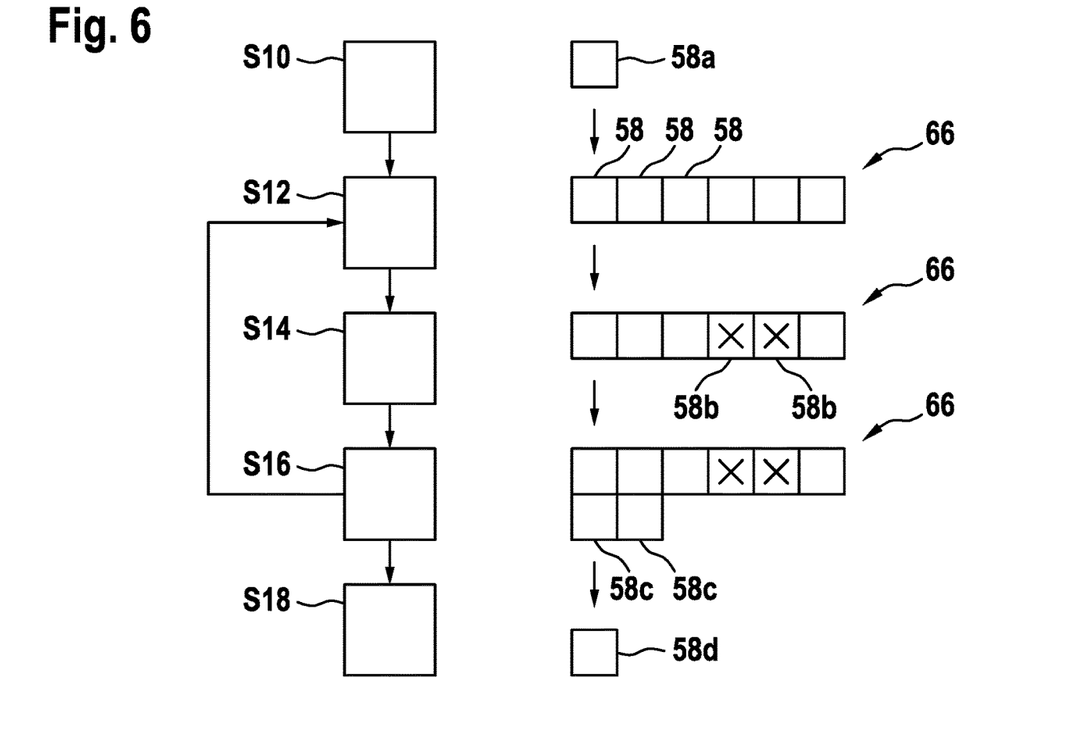
FIG. 6 shows a flow diagram for a method for optimizing a liquid class for a laboratory automation device according to an embodiment of the invention.

FIG. 6 shows a flow diagram for a method for optimizing a liquid class 58 for the laboratory automation device 12. The method may be performed by the genetic algorithm optimizer module 36 shown in FIG. 1.

In step S10, a genetic algorithm of the module 36 is initialized with a start liquid class 58a. This liquid class 58a may be provided with random numbers, i.e. each control parameter 62 may be determined randomly. It also may be possible that the start liquid class is a liquid class 58 that was determined in another way, for example by the optimization methods as described with FIG. 7.

The genetic algorithm is initialized by generating a set 66 of liquid classes 58. The set 66 is generated by modifying control parameters 62 of the start liquid class 58a. This modified liquid classes 58 may be determined by mutation and crossing-over as described above and below.

During steps S12 to S16, the liquid class 58 is iteratively optimized with the genetic algorithm.

In step S12, each liquid class 58 from the set 66 of liquid classes is applied to the laboratory automation device 12. The laboratory automation device may be controlled in such a way that a pipette tip 34 is gripped, that with the pipette tip 34 a volume 44 is aspirated from the container 26 into the pipette tip 34 and after that dispensed into the measurement device 30. All these operations may be performed with the control parameters 62 of the applied liquid class 58, i.e., the laboratory automation device 12 is controlled with the control parameters 62 of the respective liquid class 58.

In such a way, the laboratory automation device 12 performs at least one aspiration and dispensing measurement for the applied liquid class 58 and a dispensed volume 44 of a liquid of the liquid type 60 is measured.

It may be that such a measurement is repeated several times for one liquid class 58, such that statistical estimates can be produced by measuring the dispensed volume 44 several times.

In step S14, liquid classes 58b are discarded from the set 66 of liquid classes, when a selection function, which evaluates the at least one measured dispense volume 44 for a liquid class 58b, indicates this.

The selection function may be a function that evaluates process parameters that are determined from the one or more dispensed volume 44 measured for one applied liquid class. A process parameter may be a mean value of the dispensed volumes. A process parameter may be a difference of the dispensed volume or the mean value of the dispensed volumes from a desired volume respectively the accuracy of the pipetting. A further process parameter may be a variance and/or standard deviation of the dispensed volumes 44 from a mean value.

When evaluated, the selection function may produce an optimization grade of the liquid class 58. When this optimization grade (which may be a number) indicates that the liquid class 58 is not so good optimized as other liquid classes in the set 66, the liquid class 58 may be discarded, i.e. removed from the set 58.

As an example, the selection function may select liquid classes 58, where the at least one measured dispense volume 44 differs not more than a threshold from a desired dispense volume.

As a further example, the aspiration and dispensing measurement may be performed several times for an applied liquid class 58, several dispensed volumes 44 may be measured for the applied liquid class 58 and the selection function may select liquid classes 58, where a variance of the several measured dispensed volumes 44 is smaller than a threshold.

In step S16, liquid classes 58*c* are added to the set 66 of liquid classes. These liquid classes 58*c* are generated by modifying liquid classes 58 from the set 66 of liquid classes. It has to be noted that steps S14 and S16 may be performed in arbitrary order and/or simultaneously.

The genetic algorithm may either perform mutation with a liquid class 58 of the set 66 and/or may perform crossing-over with two liquid classes 58 from the set. It may be that first crossing-over and then mutation is performed.

For mutation, modified control parameters 62 for a modified liquid class 58 are generated by modifying one control parameter 62 of this liquid class 58 to create a modified liquid class 58. It may be that the liquid class 5, which was the basis for mutation, is removed from the set 66.

The one control parameter 62 which is modified may be increased or decreased. The modification may be such that the control parameter 62 stays within its bounds.

For crossing-over, modified control parameters 62 for a modified liquid class 58 are generated by combining control parameters 62 of two other liquid classes 58. It may be determined randomly, which control parameters are taken from a first liquid class and which control parameters 62 are taken from a second liquid class.

The steps S2 to S16 may be repeated until an end condition is reached, such as a fixed number of iterations and/or a desired optimization grade.

In step S18, an optimized liquid class 58*d* is selected from the set 66 of liquid classes. This may be the liquid class 58 with the best optimization grade.

Figure 7:
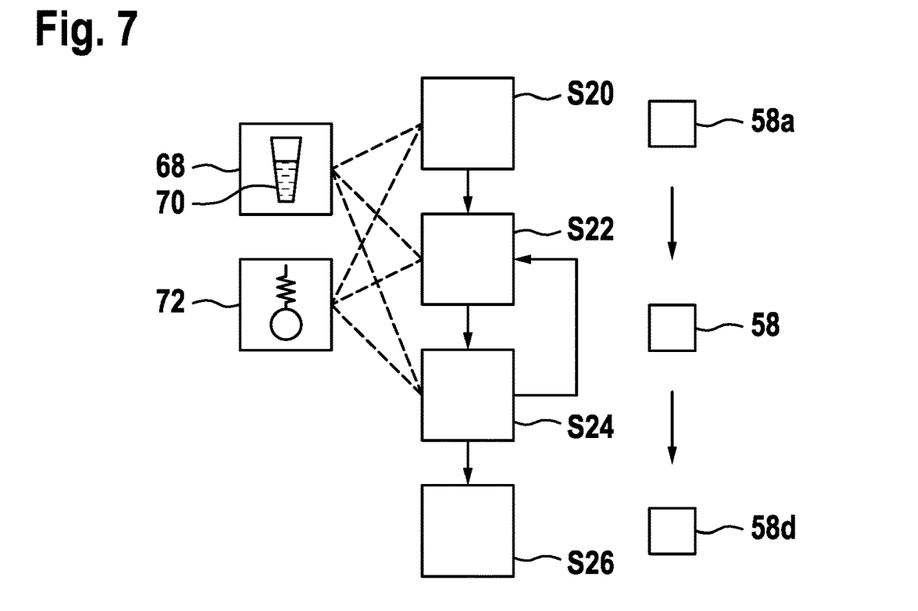
FIG. 7 shows a flow diagram for a further method for optimizing a liquid class for a laboratory automation device used together with the method of FIG. 6.

FIG. 7 shows a method for optimizing a liquid class 58 with a simulation model 68 and/or a physical model 72. This method may be used for determining a start liquid class 58*a* for the genetic algorithm optimizer module 36 and/or for further optimizing the liquid class 58*d* determined by this module 36.

For the simulation model 68, the method may be performed with the simulation model optimizer module 38. For the physical model 72, the method may be performed with the physical model optimizer module 40.

In step S20, the method is initialized with a start liquid class 58*a*. The start control parameters 62 for initializing the simulation model 68 and/or the physical model may be provided by the genetic algorithm. However, it also may be that the start control parameters 62 are provided as random numbers.

The simulation model 68 comprises a geometric representation 70 of at least a part of the dispensing and aspiration system 16 of the laboratory automation device 12. For example, the geometric representation 70 may comprise the geometric design of the system 16 as shown in FIG. 2 or 3, i.e. the geometric form of the pump 22, the hose and/or the pipette tip 34. In particular, the geometric design of the pipette tip 34 of the respective pipette tip type 64 of the liquid class 58, such as shown in FIG. 4, may be part of the simulation model 68.

It also may be that the geometric representation 70 comprises physical properties of components of the dispensing and aspiration system 16, such as a wettability of the material of the pipette tip 34, Also, the one or more liquids 28, 44, 50 in the system 16 may be modelled with the simulation model 68. Also physical properties of these liquids, such as density and/or viscosity, may be included into the simulation model 68.

On the other hand, the physical model 72 may comprise analytical equations modelling mechanical properties of at least a part of the dispensing and aspiration system 16.

In steps S22 and S24, the liquid class 58 is iteratively optimized with the simulation model 68 and/or the physical model 72.

In step S22, the part of the dispensing and aspiration system 16 modelled with the respective model 68, 72 is simulated with the control parameters 62 of the current liquid class 58, i.e. the liquid class currently simulated.

For example, the simulation model 68 may be based on finite elements and/or computational fluid dynamics. The operation of the system 16 may be simulated by moving the simulated components as demanded by the control parameters 62 of the current liquid class and by calculating the flow of the liquid 28 in the pipette tip 34.

With the physical model 72, the liquid 28 in the pipette tip 34 may be simulated based on physical properties of the liquid 28 and/or by evaluating the equations provided by the physical model 72.

It has to be noted that also a mixture of a simulation model 68 and physical model 72 may be used for simulating the system 16. In this case, the modules 38, 40 may be merged into one module.

In step S24, when the simulation has been finished, a dispensed volume 44 is determined from the simulation. In the case of the simulation model 68, this may be an amount of fluid that has left the opening of the pipette tip 34. In the case of the physical model 72, this may be an output of one of the equations.

It may be possible to simulate statistical variances with randomly modifying input parameters of the models 68, 72. In such a way, the same process parameters as described with respect to the method in FIG. 6 may be determined.

After that, current liquid class and in particular its control parameters 62 may be modified based on the dispensed volume 44 determined from the simulation. For example, this may be done with a selection function as the one described with respect to FIG. 6. It may be determined, which modifications and in particular which gradient in the space of control parameters 62 result in a better optimization grade and the control parameters 62 may be modified accordingly.

Steps S22 and S24 may be repeated until an end condition is reached, such as a fixed number of iterations or a desired optimization grade.

In step S26, the method determines an optimized liquid class 58*d*. For example, this may be the liquid class 58, which has been used for simulating the system 16 during the last iteration.

The optimized liquid class 58*d* may be used as start liquid class 58*a* and/or start control parameters 62 for initializing the genetic algorithm from the module 36, which then may further optimize the liquid class with the method of FIG. 6.

Figure 8:
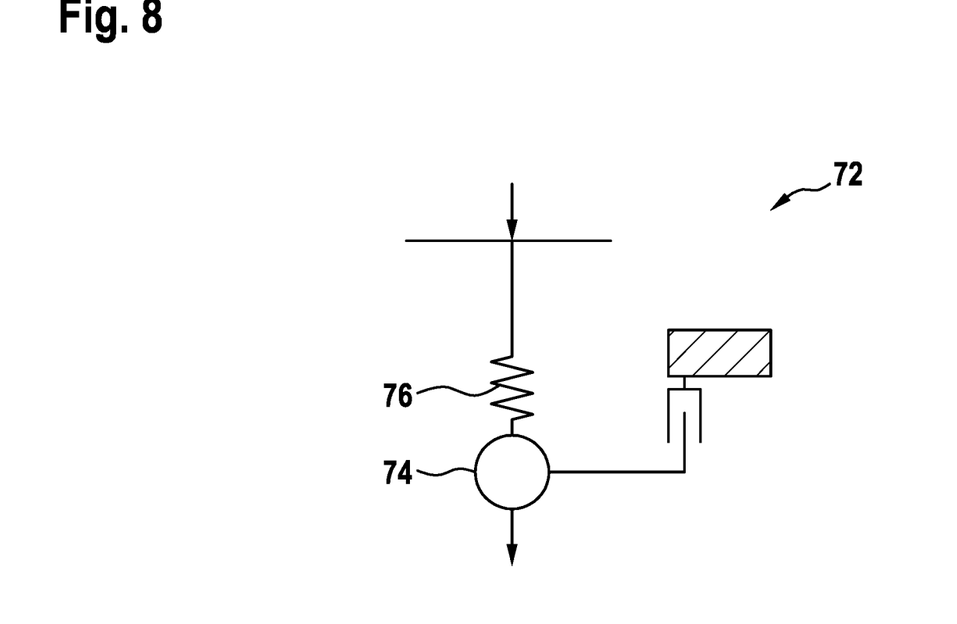
FIG. 8 shows a physical model for the method of FIG. 7.
Figure 9:
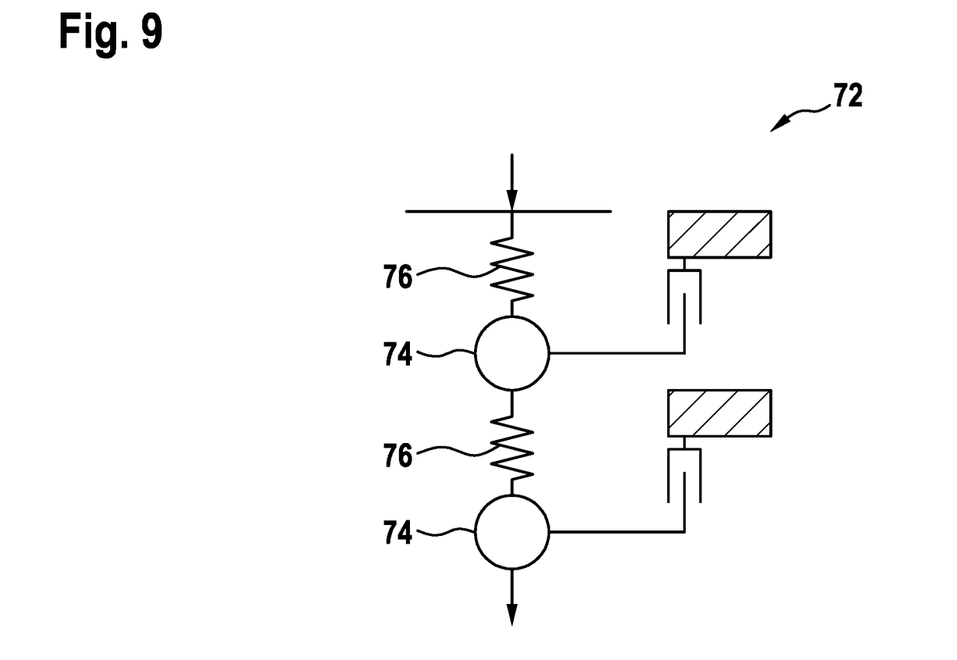
FIG. 9 shows a further physical model for the method of FIG. 7.

FIGS. 8 and 9 show examples of physical models 72 for the aspiration and dispensing system 16.

FIG. 8 shows a physical model for the system 16 shown in FIG. 2. This system 16 may be modelled with a damped mass 74 connected to a spring 76. The mass 74 may represent the liquid volume 44, the spring may represent the gas volume 48 inside the pipette tip 34 and the pump 22. The damping may be due to the opening in the pipette tip 34 and/or the compressibility of the gas volume 48.

The analytical equations used in the physical model 72 therefore may be Newton's law for accelerated masses and/or Hook's law for springs.

In general, the analytical equations of the physical model 72 may model the liquid 28 in the dispensing and aspiration system 16 as an oscillating system having at least one damped mass 74 connected to a spring 76.

FIG. 9 shows a physical model for the system 16 shown in FIG. 3. This system 16 may be modelled with two damped masses 74 interconnected by a spring 76 and connected to a further spring 76. Here, the intermediate, lower mass 74 may represent the liquid 50 in the pump 22 and the hose 46. In this case, the upper spring 76 may represent the flexibility of the hose 46.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for optimizing a liquid class for a laboratory automation device, wherein the liquid class comprises control parameters for controlling the laboratory automation device when handling a liquid of a liquid type assigned to the liquid class with a pipette tip of a pipette tip type assigned to the liquid class, the method comprising:
   initializing a genetic algorithm with a start liquid class by generating a set of liquid classes by modifying control parameters of the start liquid class;
   optimizing the liquid class iteratively with the genetic algorithm by:
      applying liquid classes from the set of liquid classes to the laboratory automation device, which laboratory automation device performs at least one aspiration and dispensing measurement for each applied liquid class, wherein during an aspiration and dispensing measurement, the laboratory automation device is controlled with the control parameters of the respective applied liquid class and a dispensed volume of a liquid of the liquid type is measured;
      discarding liquid classes from the set of liquid classes responsive to a selection function that evaluates the at least one measured dispense volume for a liquid class;
      adding liquid classes to the set of liquid classes, where the liquid classes that are added are generated by modifying liquid classes from the set of liquid classes; and
      selecting an optimized liquid class from the set of liquid classes,
   wherein the liquid class is additionally optimized with at least one of a simulation model, which comprises a geometric representation of at least a part of a dispensing and aspiration system of the laboratory automation device comprising a pipette tip of the pipette tip type, and a physical model, which comprises analytical equations modelling mechanical properties of at least a part of the dispensing and aspiration system,
   wherein at least one of:
   start control parameters for initializing the genetic algorithm are provided by at least one of the simulation model and the physical model, and
   start control parameters for initializing at least one of the simulation model and the physical model are provided by the genetic algorithm,
   wherein the liquid class is iteratively optimized with at least one of the simulation model and the physical model by:
      simulating the part of the dispensing and aspiration system with the control parameters of the liquid class, wherein a liquid in the pipette tip is simulated based on physical properties of the liquid;
      determining a dispensed volume from the at least one of the simulation model and the physical model; and
   modifying the control parameters based on the dispensed volume; and
   wherein the method further comprises controlling the laboratory automation device based on the control parameters.

2. The method of claim 1, wherein:
   the selection function selects liquid classes, where the at least one measured dispense volume differs not more than a threshold from a desired dispense volume; and/or
   the aspiration and dispensing measurement is performed several times for an applied liquid class, several dispensed volumes are measured for the applied liquid class and the selection function selects liquid classes, where a variance of the several measured dispense volumes is smaller than a threshold.

3. The method of claim 1, wherein:
   modified control parameters for a modified liquid class are generated by modifying one control parameter of another liquid class; and/or
   modified control parameters for a modified liquid class are generated by combining control parameters of two other liquid classes.

4. The method of claim 1, wherein the control parameters comprise at least one of:
   an aspiration speed, an aspiration acceleration and/or aspiration delay;
   a dispensing speed, a dispensing acceleration and/or a dispensing delay;
   a dipping speed and/or dipping acceleration of the pipette tip;
   a pulling speed and/or pulling acceleration of the pipette tip;
   an additional aspiration volume;
   a dipping depth;
   an airgap size; and a subvolume size of an aspirated and/or dispensed volume.

5. The method of claim 1, wherein:
the simulation model is based on finite elements and/or computational fluid dynamics; and/or
the part of the dispensing and aspiration system represented by the simulation model furthermore comprises a pump and a hose connecting the pump to the pipette tip; and/or
the geometric representation comprises physical properties of components of the dispensing and aspiration system.

6. The method of claim 1, wherein the analytical equations model the liquid in the dispensing and aspiration system as an oscillating system having at least one damped mass connected to a spring.

7. A computer program stored on a non-transitory computer-readable medium for optimizing a liquid class for a laboratory automation device, which, when being executed by a processor, is configured to perform a method for optimizing a liquid class for a laboratory automation device, wherein the liquid class comprises control parameters for controlling the laboratory automation device when handling a liquid of a liquid type assigned to the liquid class with a pipette tip of a pipette tip type assigned to the liquid class, the method comprising:
  initializing a genetic algorithm with a start liquid class by generating a set of liquid classes by modifying control parameters of the start liquid class; and
  optimizing the liquid class iteratively with the genetic algorithm by:
    applying liquid classes from the set of liquid classes to the laboratory automation device, which laboratory automation device performs at least one aspiration and dispensing measurement for each applied liquid class, wherein during an aspiration and dispensing measurement, the laboratory automation device is controlled with the control parameters of the respective applied liquid class and a dispensed volume of a liquid of the liquid type is measured;
    discarding liquid classes from the set of liquid classes responsive to a selection function that evaluates the at least one measured dispense volume for a liquid class;
    adding liquid classes to the set of liquid classes, where the liquid classes that are added are generated by modifying liquid classes from the set of liquid classes; and
    selecting an optimized liquid class from the set of liquid classes,
  wherein the liquid class is additionally optimized with at least one of a simulation model, which comprises a geometric representation of at least a part of a dispensing and aspiration system of the laboratory automation device comprising a pipette tip of the pipette tip type; and a physical model, which comprises analytical equations modelling mechanical properties of at least a part of the dispensing and aspiration system;
  wherein at least one of:
  start control parameters for initializing the genetic algorithm are provided by at least one of the simulation model and the physical model; and
  start control parameters for initializing at least one of the simulation model and the physical model are provided by the genetic algorithm;
  wherein the liquid class is iteratively optimized with at least one of the simulation model and the physical model by:
    simulating the part of the dispensing and aspiration system with the control parameters of the liquid class, wherein a liquid in the pipette tip is simulated based on physical properties of the liquid;
    determining a dispensed volume from the at least one of the simulation model and the physical model; and
    modifying the control parameters based on the dispensed volume; and
  controlling the laboratory automation device based on the control parameters.

8. An optimization system for optimizing a liquid class for a laboratory automation device, the optimization system comprising:
  the laboratory automation device; and
  a computing device communicatively interconnected with the laboratory automation device, wherein:
  the computing device comprises a genetic algorithm optimizer module; and
  the optimization system is configured to perform a method for optimizing a liquid class for a laboratory automation device, wherein the liquid class comprises control parameters for controlling the laboratory automation device when handling a liquid of a liquid type assigned to the liquid class with a pipette tip of a pipette tip type assigned to the liquid class, the method comprising:
    initializing a genetic algorithm with a start liquid class by generating a set of liquid classes by modifying control parameters of the start liquid class; and
    optimizing the liquid class iteratively with the genetic algorithm by:
      applying liquid classes from the set of liquid classes to the laboratory automation device, which laboratory automation device performs at least one aspiration and dispensing measurement for each applied liquid class, wherein during an aspiration and dispensing measurement, the laboratory automation device is controlled with the control parameters of the respective tip type; and a physical model, which comprises analytical equations modelling mechanical properties of at least a part of the dispensing and aspiration system; and
  wherein at least one of:
  start control parameters for initializing the genetic algorithm are provided by at least one of the simulation model and the physical model; and
  start control parameters for initializing at least one of the simulation model and the physical model are provided by the genetic algorithm,
  wherein the liquid class is iteratively optimized with at least one of the simulation model and the physical model by:
    simulating the part of the dispensing and aspiration system with the control parameters of the liquid class, wherein a liquid in the pipette tip is simulated based on physical properties of the liquid;
    determining a dispensed volume from the at least one of the simulation model and the physical model; and
    modifying the control parameters based on the dispensed volume; and
  controlling the laboratory automation device based on the control parameters.

9. The optimization system of claim 8, wherein the computing device further comprises a simulation model optimizer module and/or a physical model optimizer module.

10. The computer program of claim 7, wherein:
the selection function selects liquid classes, where the at least one measured dispense volume differs not more than a threshold from a desired dispense volume; and/or
the aspiration and dispensing measurement is performed several times for an applied liquid class, several dispensed volumes are measured for the applied liquid class and the selection function selects liquid classes, where a variance of the several measured dispense volumes is smaller than a threshold.

11. The computer program of claim 7, wherein:
modified control parameters for a modified liquid class are generated by modifying one control parameter of another liquid class; and/or
modified control parameters for a modified liquid class are generated by combining control parameters of two other liquid classes.

12. The computer program of claim 7, wherein the control parameters comprise at least one of:
an aspiration speed, an aspiration acceleration and/or aspiration delay;
a dispensing speed, a dispensing acceleration and/or a dispensing delay;
a dipping speed and/or dipping acceleration of the pipette tip;
a pulling speed and/or pulling acceleration of the pipette tip;
an additional aspiration volume;
a dipping depth;
an airgap size; and
a subvolume size of an aspirated and/or dispensed volume.

13. The computer program of claim 7, wherein:
the simulation model is based on finite elements and/or computational fluid dynamics;
and/or the part of the dispensing and aspiration system represented by the simulation model furthermore comprises a pump and a hose connecting the pump to the pipette tip; and/or
the geometric representation comprises physical properties of components of the dispensing and aspiration system.

14. The optimization system of claim 8, wherein:
the selection function selects liquid classes, where the at least one measured dispense volume differs not more than a threshold from a desired dispense volume; and/or
the aspiration and dispensing measurement is performed several times for an applied liquid class, several dispensed volumes are measured for the applied liquid class and the selection function selects liquid classes, where a variance of the several measured dispense volumes is smaller than a threshold.

15. The optimization system of claim 8, wherein:
modified control parameters for a modified liquid class are generated by modifying one control parameter of another liquid class; and/or
modified control parameters for a modified liquid class are generated by combining control parameters of two other liquid classes.

16. The optimization system of claim 8, wherein the control parameters comprise at least one of:
an aspiration speed, an aspiration acceleration and/or aspiration delay;
a dispensing speed, a dispensing acceleration and/or a dispensing delay;
a dipping speed and/or dipping acceleration of the pipette tip;
a pulling speed and/or pulling acceleration of the pipette tip;
an additional aspiration volume;
a dipping depth;
an airgap size; and
a subvolume size of an aspirated and/or dispensed volume.

17. The optimization system of claim 8, wherein:
the simulation model is based on finite elements and/or computational fluid dynamics; and/or
the part of the dispensing and aspiration system represented by the simulation model furthermore comprises a pump and a hose connecting the pump to the pipette tip; and/or
the geometric representation comprises physical properties of components of the dispensing and aspiration system.

* * * * *